United States Patent
Hobson

(10) Patent No.: US 9,482,370 B2
(45) Date of Patent: Nov. 1, 2016

(54) LINE CLAMP ASSEMBLY AND METHOD OF USE

(71) Applicant: IMAGE INDUSTRIES, INC., Huntley, IL (US)

(72) Inventor: Blake Hobson, Lakewood, IL (US)

(73) Assignee: IMAGE INDUSTRIES, INC., Huntley, IL (US)

( * ) Notice: Subject to any disclaimer, the term of this patent is extended or adjusted under 35 U.S.C. 154(b) by 0 days.

(21) Appl. No.: 14/704,575

(22) Filed: May 5, 2015

(65) Prior Publication Data

US 2015/0323101 A1    Nov. 12, 2015

Related U.S. Application Data

(60) Provisional application No. 61/989,138, filed on May 6, 2014.

(51) Int. Cl.
| | |
|---|---|
| *F16L 3/127* | (2006.01) |
| *F16L 3/13* | (2006.01) |
| *F16L 55/035* | (2006.01) |
| *H02G 3/32* | (2006.01) |

(52) U.S. Cl.
CPC .................. *F16L 3/127* (2013.01); *F16L 3/13* (2013.01); *F16L 55/035* (2013.01); *H02G 3/32* (2013.01); *Y10T 29/49961* (2015.01)

(58) Field of Classification Search
CPC ......... F13L 3/127; F16L 55/035; F16L 3/12; F16L 3/10; F16L 3/105; H02G 3/32
USPC ......... 248/68.1, 69, 73, 74.1, 74.2, 74.5, 62, 248/74.3
See application file for complete search history.

(56) References Cited

U.S. PATENT DOCUMENTS

| | | | | |
|---|---|---|---|---|
| 3,933,377 A * | 1/1976 | Arrowood | ............ | F16L 21/005 248/62 |
| 4,417,755 A * | 11/1983 | Gittleman | ............ | F16L 21/065 285/367 |
| 4,530,478 A * | 7/1985 | McClellan | ............ | F16L 59/135 138/106 |
| 5,014,940 A * | 5/1991 | Sherman | ................... | F16L 3/04 248/62 |
| 5,215,281 A * | 6/1993 | Sherman | ............... | F16L 55/035 248/219.4 |
| 6,595,473 B2 * | 7/2003 | Aoki | ................... | B60R 16/0215 138/108 |
| 6,717,055 B2 * | 4/2004 | Kato | ........................ | H02G 3/32 173/136 |
| 7,546,986 B2 * | 6/2009 | Kim | ...................... | F16L 3/1008 248/62 |

(Continued)

*Primary Examiner* — Adriana Figueroa
*Assistant Examiner* — Jessie Fonseca
(74) *Attorney, Agent, or Firm* — McAndrews, Held & Malloy, Ltd.

(57) ABSTRACT

Various embodiments provide a line clamp assembly that includes a base, cradle, and clamp. The base includes wings and a body. The wings extend from the body and each includes a routing port. The body is configured to be welded to a structure. The cradle includes a generally C-shaped body that defines a channel and an opening. The channel is configured to receive the line via the opening. The cradle is configured to sit on the base. The clamp includes a body having ends that each include an attachment configured to mate with a corresponding routing port of the wings. A force is applied to the cradle to compress the cradle such that the attachments are mated with the routing ports. The force applied to the cradle is removed after the attachments are mated with the routing ports such that the cradle expands to apply pressure to the clamp.

20 Claims, 6 Drawing Sheets

(56) References Cited

U.S. PATENT DOCUMENTS

| | | | | |
|---|---|---|---|---|
| 2007/0007397 A1* | 1/2007 | Nelson | F16L 3/2235 | 248/68.1 |
| 2009/0265895 A1* | 10/2009 | Box | F16L 3/12 | 24/20 R |
| 2013/0048798 A1* | 2/2013 | Bock | F16L 3/1091 | 248/67.5 |
| 2015/0059826 A1* | 3/2015 | Reed | F24J 2/5264 | 136/246 |
| 2015/0275578 A1* | 10/2015 | Sylvester | E06C 7/14 | 248/68.1 |

* cited by examiner

LINE CLAMP ASSEMBLY AND METHOD OF USE

CROSS-REFERENCE TO RELATED APPLICATIONS/INCORPORATION BY REFERENCE

The present application claims priority under 35 U.S.C. §119(e) to provisional application Ser. No. 61/989,138 filed on May 6, 2014, entitled "Line Clamp Assembly and Method of Use." The above-referenced provisional application is hereby incorporated herein by reference in its entirety.

U.S. patent application Ser. No. 13/422,685, by Hobson, published Sep. 20, 2012 as U.S. Publication No. 2012/0233821, is incorporated by reference herein in its entirety.

FIELD OF THE INVENTION

Certain embodiments of the invention relate to line retention assemblies. More specifically, certain embodiments of the invention relate to a system and method for retaining and enhancing the routing of rigid or flexible lines, such as hydraulic lines or electrical conduit, on equipment, machinery, or any suitable structure.

BACKGROUND OF THE INVENTION

Various types of machinery employ line retention devices that are used to route and/or secure wires, cables, tubes, flexible pipe, hoses, and the like (collectively lines) in or around construction equipment, service vehicles, or any suitable machinery. In use, the lines may be secured to one or more devices that are affixed to one or more pieces or components of the machinery. Such devices generally secure the lines at a desired location and/or in a relatively close proximity to the machinery. Further, such devices may be used for a number of different purposes, including, for example, preventing the lines from moving or being moved to locations that may interfere with the operation of machinery, and/or to protect the lines and attached components from being entangled and/or pulled on by other machinery or people.

Existing line retention devices are expensive, cumbersome, and labor intensive to install. For example, FIG. 1 is a front perspective view of a line retention device 400 as is known in the art. Referring to FIG. 1, the line retention device 400 includes a bottom plate 410, a lower line holder 420, an upper line holder 430, a top plate 440, bolts 450, and washers. The bottom plate 410 may be welded or otherwise secured to a structure. For example, the structure can be drilled and tapped such that bolts 450 pass through the bottom plate 410 and thread into the structure. The lower line holder 420 is placed on the bottom plate 410 and a line is laid in the lower line holder 420. The upper line holder 430 is placed over the line and on top of the lower line holder 420. The top plate 440 is placed on the upper line holder 430 and bolts 450 and washers are inserted through the stacked assembly 410-440. The bolts 450 are typically manually tightened to secure the line within the line retention device 400. The line retention device 400 may cost several dollars and requires significant labor and time to manipulate and assemble the multiple pieces.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for retaining and routing a line along a structure, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
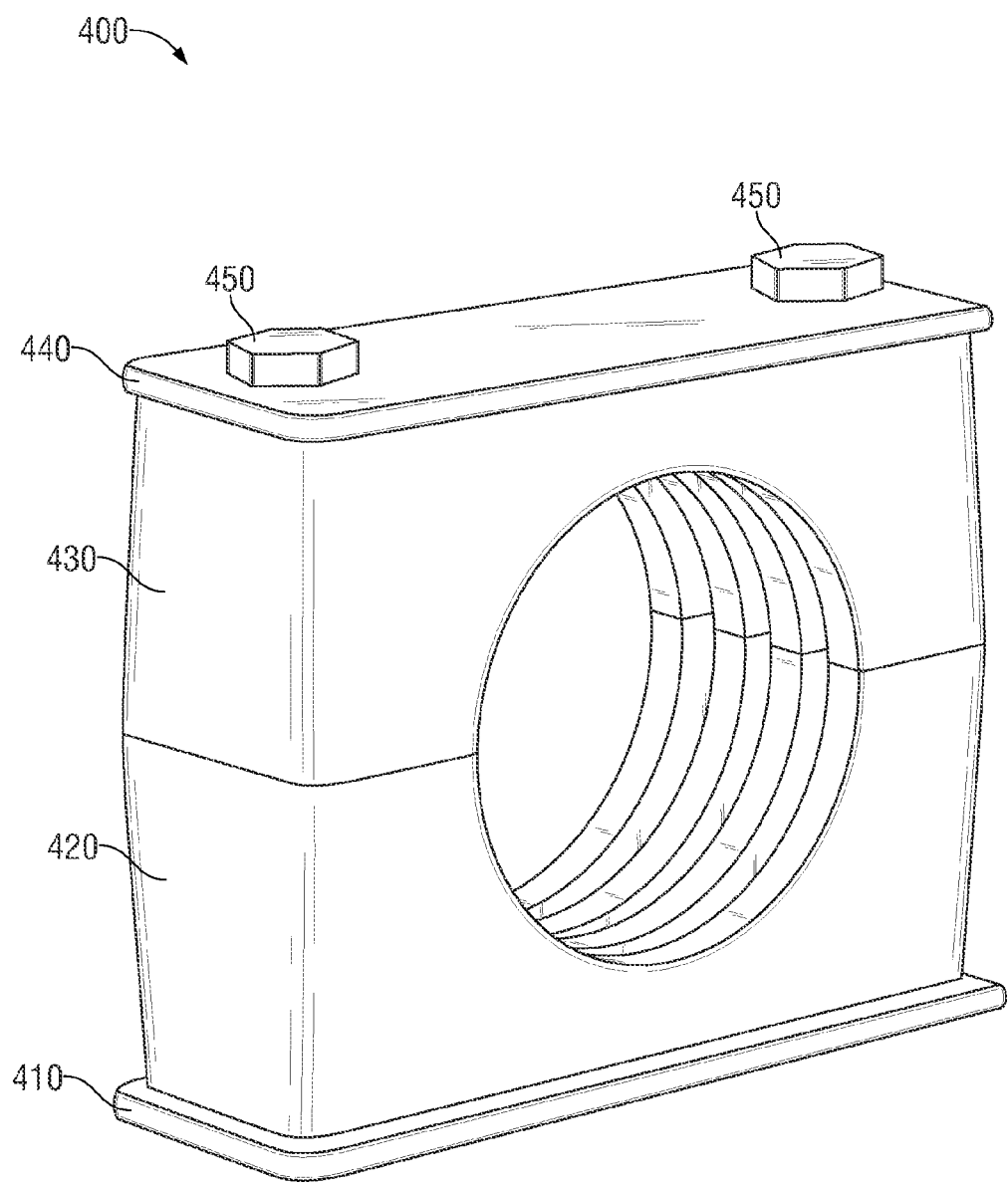
FIG. 1 is a front perspective view of a line retention device as is known in the art.

Certain embodiments of the invention may be found in a line clamp assembly and method of use. More specifically, certain embodiments provide a system and method for retaining and enhancing the routing of lines on a structure. An example embodiment of the present invention aids users with preventing lines, such as wires, cables, tubes, flexible pipe, hoses, and the like, from entangling and/or interfering with operation of machinery or passersby.

Various embodiments provide a line clamp assembly 100 for retaining and routing a line 20 along a structure 10 comprises a base 110, a cradle 120, and a clamp 130. The base 110 comprises a first wing 114, a second wing 114, and a body 112. The first wing 114 and the second wing 114 extend from the body 112. The first wing 114 and the second wing 114 each comprise a routing port 116. The body 112 is configured to be welded to the structure 10. The cradle 120 comprises a generally C-shaped body 122 that defines a channel 124 and an opening 126. The channel 124 is configured to receive the line 20 via the opening 126. The cradle 120 is configured to sit on the base 110. The clamp 130 comprises a body 132 having a first end and a second end. The first end and the second end each comprise an attachment 134 configured to mate with a corresponding one of the routing port 116 of the first wing 114 and the second wing 114. In various embodiments, a force is applied to the cradle 120 to compress the cradle 120 such that the attachment 134 of each of the first end and the second end is mated with the corresponding one of the routing port 116 of the first wing 114 and the second wing 114. The force applied to the cradle 120 is removed after the attachment 134 of each of the first end and the second end is mated with the corresponding one of the routing port 116 of the first wing 114 and the second wing 114 such that the cradle 120 expands to apply pressure to the clamp 130.

Certain embodiments provide a method 200 for retaining and routing a line 20 along a structure 10. The method 200 comprises welding 202 a base 110 to the structure 10. The method 200 comprises manipulating 204 the line 20 into a cradle 120. The method 200 comprises placing 206 the cradle 120 holding the line 20 on the base 110. The method 200 comprises applying 208 a force to the cradle 120 to compress the cradle 120 and extending 208 a clamp 130 having a first attachment 134 and a second attachment 134 over the compressed cradle 120. The method 200 comprises attaching 210 the first attachment 134 and the second attachment 134 to the base 110. The method 200 comprises removing 212 the force to the cradle 120 such that the cradle 120 expands. The expanded cradle 120 applies pressure to the clamp 130.

As used herein, the terms "exemplary" or "example" means serving as a non-limiting example, instance, or illustration. As used herein, the term "e.g." introduces a list of one or more non-limiting examples, instances, or illustrations.

As used herein, an element recited in the singular and proceeded with the word "a" or "an" should be understood as not excluding plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Figure 2:
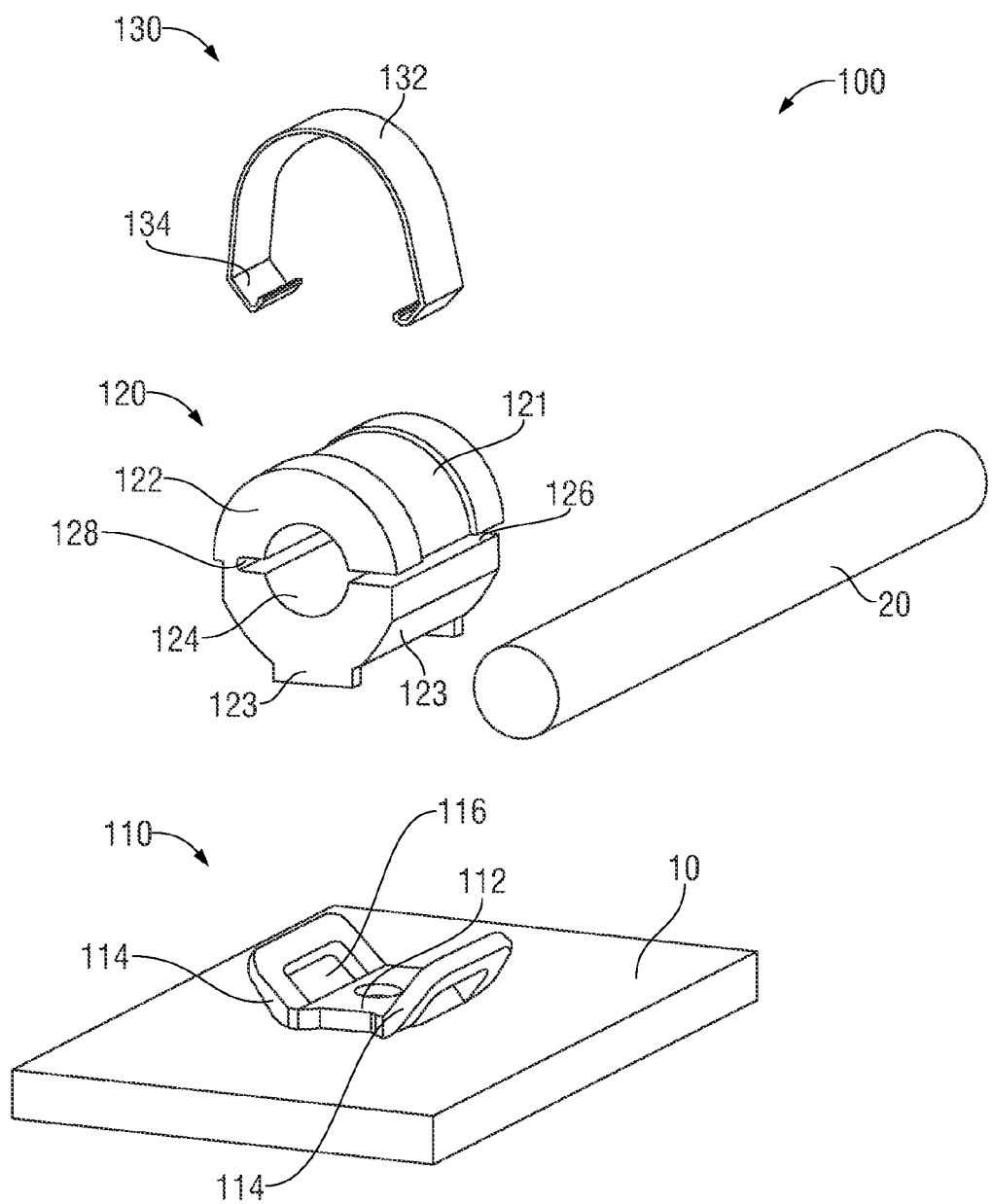
FIG. 2 is an exploded view of an exemplary line clamp assembly, in accordance with an embodiment of the invention.
Figure 3:
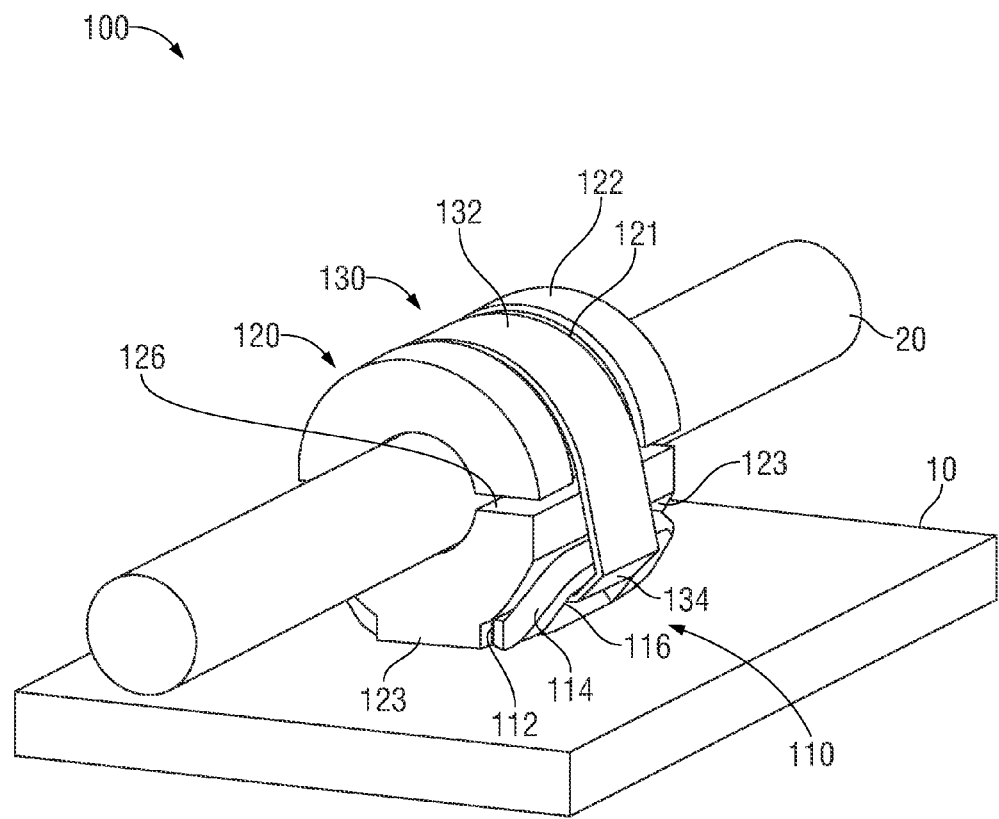
FIG. 3 is a perspective view of an exemplary line clamp assembly, in accordance with an embodiment of the invention.
Figure 4:
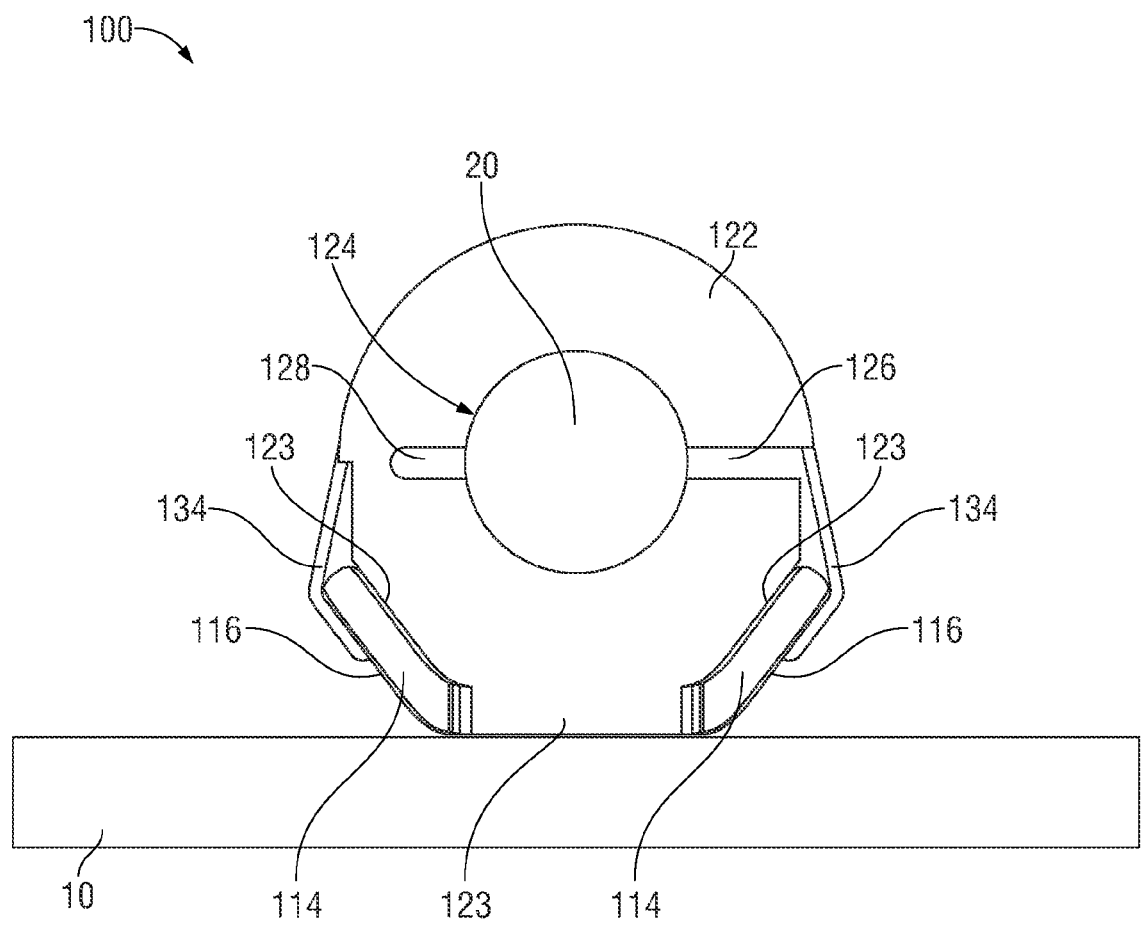
FIG. 4 is an end elevation view of an exemplary line clamp assembly, in accordance with an embodiment of the invention.

FIG. 2 is an exploded view of an exemplary line clamp assembly 100, in accordance with an embodiment of the invention. FIG. 3 is a perspective view of an exemplary line clamp assembly 100, in accordance with an embodiment of the invention. FIG. 4 is an end elevation view of an exemplary line clamp assembly 100, in accordance with an embodiment of the invention. Referring to FIGS. 2-4, the line clamp assembly 100 comprises a base 110, a cradle 120, and a clamp 130. The base 110 may be a stackable routing clip as described in U.S. patent application Ser. No. 13/422,685, by Hobson, published Sep. 20, 2012 as U.S. Publication No. 2012/0233821, which is incorporated by reference herein in its entirety. The base 110 can include a body 112 and wings 114 that extend away from the body 112. The wings 112 may each comprise a routing port configured to receive, for example, a cable tie, clamp 130, or tie down extension assembly 300. The base 110 may have a unitary construction that is made from a variety of different weldable materials, including, for example, carbon steel, stainless steel, and aluminum, among others. The line clamp assembly 100 is secured to a structure 10, such as construction equipment, service vehicles, or any suitable machinery, by welding the base 110 to the structure 10. In various embodiments, the base 110 comprises a shape, protrusions, and/or recessed grooves that are configured to correspond with a bottom contour, recessed grooves, and/or protrusions of the cradle 120 as described below.

The cradle 120 may be a one-piece, compressible and expandable component comprising a generally C-shaped body 122 that defines an opening 126 and a channel 124 for receiving and holding a line 20. The cradle 120 can be plastic, such as urethane, or any suitable compressible and expandable material. The cradle 120 is manipulated around the line 20 via the opening 126 such that the line is held within the channel 124. In various embodiments, the cradle 120 includes a groove 128 that may be opposite the opening 126 on an inner surface of the body 122. The groove 128 may extend the length of the body 122 and can be a hinge point to allow for easier widening of the opening 126 while manipulating the line 20 into the channel 124 within the body 122 of the cradle 120. The body 122 of the cradle 120 may comprise a recessed groove 121 on a top outer surface configured to receive the clamp 130 as described below. The body 122 of the cradle 120 can comprise a bottom contour 123, recessed grooves, and/or protrusions configured to correspond with a shape, protrusions, and/or recessed grooves of the base 110 to assist with aligning the body 122 of the cradle 120 in a fixed position relative to the base 110. In various embodiments, the body 122 of the cradle 120 is a same length or longer than the base 110 such that a surface contact area between the body 122 of the cradle 120 and the base 110 is maximized to assist in preventing sliding of the body 122 across the base 110 when the line clamp assembly 100 is engaged.

The clamp 130 comprises a clamp body 132 and attachments 134. The clamp body 132 is configured to extend over the body 122 of the cradle 120. In various embodiments, the clamp body 132 may fit into a recessed groove 121 along a top outer surface of the body 122 of the cradle 120. The attachments 134 are configured to mate with the routing ports 116 of the wings 114 of the base 110 to secure the clamp 130 to the base 110 such that the clamp body 132 applies tension to the body 122 of the cradle 120 to hold the cradle 120 against the base 110. The attachments 134 can be, for example, bent ends that form hooks or any suitable attachment mechanism. The clamp 130 can be steel or any suitable material that has a spring characteristic configured to keep tension on the cradle 120 without fatiguing when attached to the base 110. In certain embodiments, the base 110 and/or the clamp 130 can include a locking mechanism to prevent inadvertent disassembly if, for example, the line clamp assembly 100 is struck with enough force during use.

Figure 5:
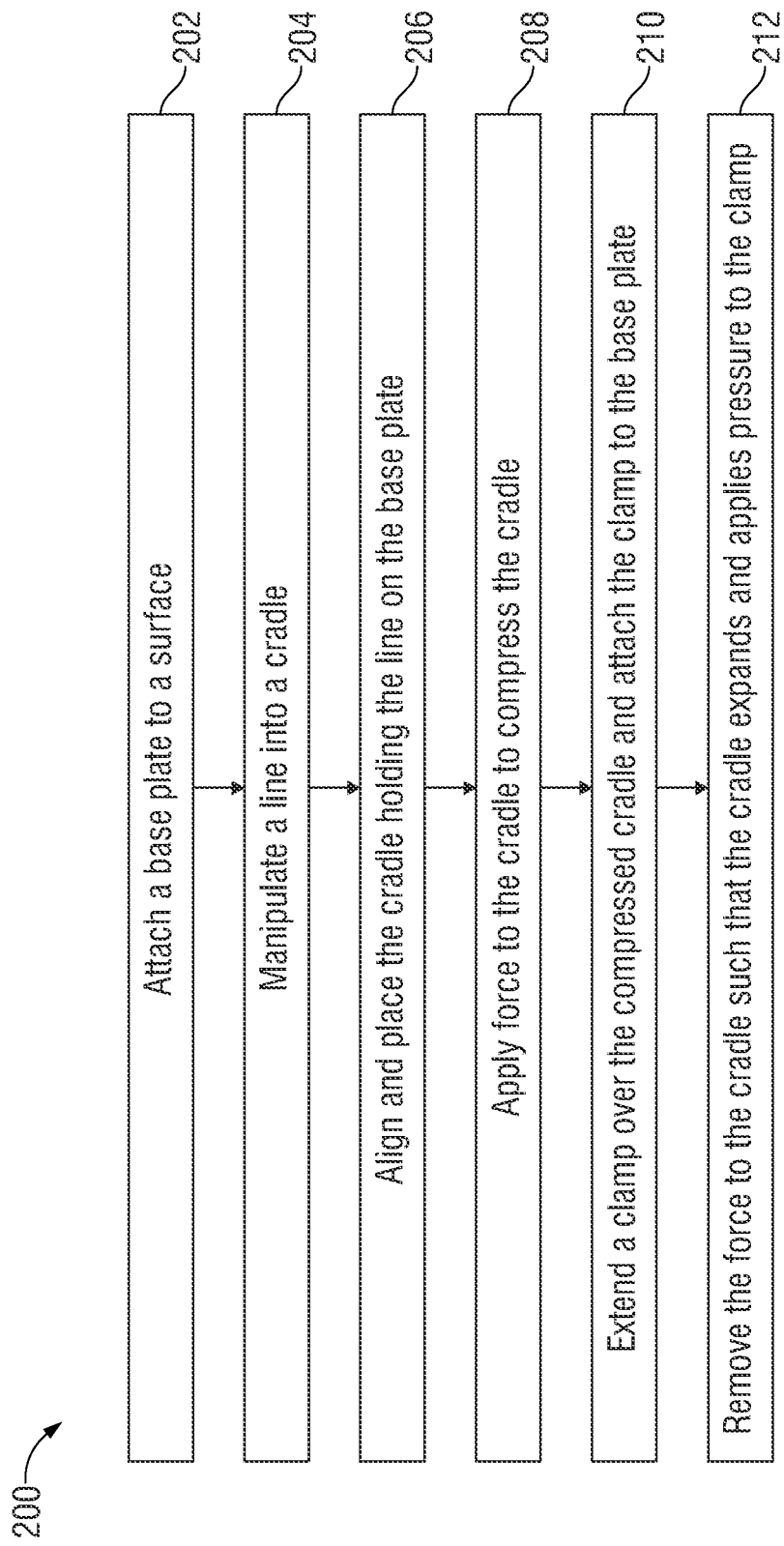
FIG. 5 is a flow chart illustrating exemplary steps that may be utilized for retaining and routing a line along a structure, in accordance with an embodiment of the invention.

FIG. 5 is a flow chart 200 illustrating exemplary steps that may be utilized for retaining and routing a line 20 along a structure 10, in accordance with an embodiment of the invention. Referring to FIG. 5, there is shown a flow chart 200 comprising exemplary steps 202 through 212. Certain embodiments of the present invention may omit one or more of the steps, and/or perform the steps in a different order than the order listed, and/or combine certain of the steps discussed below. For example, some steps may not be performed in certain embodiments of the present invention. As a further example, certain steps may be performed in a different temporal order, including simultaneously, than listed below.

In step 202, a base plate 110 is attached to a surface 10. For example, the base plate 110 can be a stackable routing clip as described in U.S. patent application Ser. No. 13/422, 685, by Hobson, published Sep. 20, 2012 as U.S. Publication No. 2012/0233821, which is incorporated by reference herein in its entirety. The base plate 110 may be welded or attached by any suitable mechanism to the surface 10, which may be construction equipment, service vehicles, or any suitable machinery.

In step 204, the line 20 is manipulated into a cradle 120. The cradle 120 can be a one-piece urethane body 122 with a C-shaped cut out to form a channel 124 and opening 126. The body 122 is pulled apart to widen the opening 126 such that the body 122 can be placed around the line 20 within the channel 124. A groove 128 on an inner surface of the body 122 can act as a hinge point to assist in allowing the opening 126 to widen as the body 122 is pulled.

In step 206, the cradle 120 is aligned with and placed on the base plate 110. In various embodiments, the cradle 120 has bottom contours 123, recessed grooves, and/or protrusions that nest with corresponding shapes, protrusions, and/or recessed grooves in the base plate 110. The cradle 120 fits over base plate 110 such that the base plate 110 prevents the cradle 120 from moving relative to the base plate 110.

In step 208, a force is applied to the body 122 of the cradle 120 to compress the body 122. The cradle 120 can be plastic, such as urethane, or any suitable compressible and expandable material. The force can be applied by hand or using a tool, among other things. In various embodiments, the clamp 130 may provide the compressive force to the body 122 of the cradle 120 during installation at step 210.

In step 210, a clamp 130 is extended over the compressed body 122 of the cradle 120 and attached to the base plate 110. The clamp 130 comprises a body 132 that extends over the body 122 of the cradle 120 and attachments 134 configured to secure the clamp 130 to the base plate 110. In various embodiments, the clamp 130 is not long enough to extend over the body 122 and attach to the base plate 110 without compressing the body 122. In certain embodiments, the clamp body 132 may fit into a recessed groove 121 along a top outer surface of the body 122 of the cradle 120. The clamp attachments 134 are configured to mate with the routing ports 116 of the wings 114 of the base plate 110. The attachments 134 may be bends on each end of the clamp 130 that hook into the routing ports 116, for example.

In step 212, the force applied to the body 122 of the cradle 120 is removed and the cradle body 122 expands to apply pressure to the clamp 130. The pressure applied by the cradle body 122 to the clamp 130 secures the line clamp assembly 100. The clamp 130 can be steel or any suitable material that has a spring characteristic configured to keep tension on the cradle 120 without fatiguing when attached to the base 110.

Figure 6:
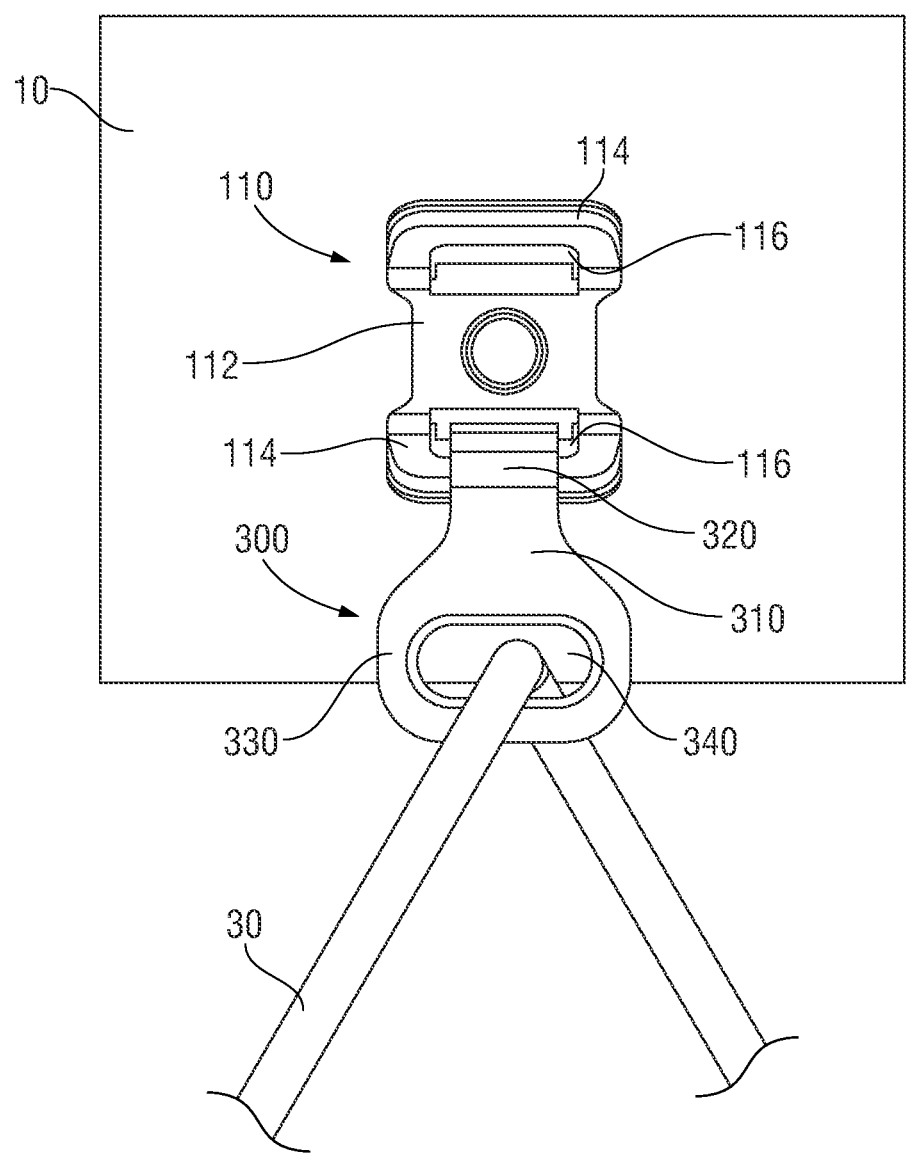
FIG. 6 is a top elevation view of an exemplary tie down extension assembly, in accordance with an embodiment of the invention.

FIG. 6 is a top elevation view of an exemplary tie down extension assembly 110, 300, in accordance with an embodiment of the invention. Referring to FIG. 6, tie down extension assembly 110, 300 comprises a base 110 and a tie down extension 300. The base 110 may be a stackable routing clip as described in U.S. patent application Ser. No. 13/422,685, by Hobson, published Sep. 20, 2012 as U.S. Publication No. 2012/0233821, which is incorporated by reference herein in its entirety. The base 110 can include a body 112 and wings 114 that extend away from the body 112. The wings 112 may each comprise a routing port configured to receive, for example, a cable tie, clamp 130, or tie down extension assembly 300. The base 110 may have a unitary construction that is made from a variety of different weldable materials, including, for example, carbon steel, stainless steel, and aluminum, among others. The base 110 is configured to be secured to a structure 10, such as construction equipment, service vehicles, or any suitable machinery, by welding or any suitable securement mechanism.

The tie down extension 300 includes a body 310, an attachment 320 at a first end of the body 310, and an extension wing 330 having an extension routing port 340 at a second end of the body 310. The tie down extension 300 can be steel, aluminum or any suitable material. The attachment 320 can be a hook or any suitable mechanism for securely attaching the tie down extension 300 to the wing 114 of the base 110 via the routing port 116. In various embodiments, the attachment 320 can be rotatable around at least a portion of the wing 114. The extension wing 330 can be formed to define the extension routing port 340. The extension routing port 340 is an aperture through the extension wing 330 that is configured to receive, for example, a cable tie 30, among other things.

In accordance with various embodiments of the invention, a line clamp assembly 100 for retaining and routing a line 20 along a structure 10 comprises a base 110, a cradle 120, and a clamp 130. The base 110 comprises a first wing 114, a second wing 114, and a body 112. The first wing 114 and the second wing 114 extend from the body 112. The first wing 114 and the second wing 114 each comprise a routing port 116. The body 112 is configured to be welded to the structure 10. The cradle 120 comprises a generally C-shaped body 122 that defines a channel 124 and an opening 126. The channel 124 is configured to receive the line 20 via the opening 126. The cradle 120 is configured to sit on the base 110. The clamp 130 comprises a body 132 having a first end and a second end. The first end and the second end each comprise an attachment 134 configured to mate with a corresponding one of the routing port 116 of the first wing 114 and the second wing 114. In various embodiments, a force is applied to the cradle 120 to compress the cradle 120 such that the attachment 134 of each of the first end and the second end is mated with the corresponding one of the routing port 116 of the first wing 114 and the second wing 114. The force applied to the cradle 120 is removed after the attachment 134 of each of the first end and the second end is mated with the corresponding one of the routing port 116 of the first wing 114 and the second wing 114 such that the cradle 120 expands to apply pressure to the clamp 130.

Aspects of the present invention provide a method 200 for retaining and routing a line 20 along a structure 10. The method 200 comprises welding 202 a base 110 to the structure 10. The method 200 comprises manipulating 204 the line 20 into a cradle 120. The method 200 comprises placing 206 the cradle 120 holding the line 20 on the base 110. The method 200 comprises applying 208 a force to the cradle 120 to compress the cradle 120 and extending 208 a clamp 130 having a first attachment 134 and a second attachment 134 over the compressed cradle 120. The method 200 comprises attaching 210 the first attachment 134 and the second attachment 134 to the base 110. The method 200 comprises removing 212 the force to the cradle 120 such that the cradle 120 expands. The expanded cradle 120 applies pressure to the clamp 130. In an example embodiment, the first attachment 134 is attached to the base 110 before the force is applied to the cradle 120 the second attachment 134 is attached to the base 110 after the force is applied to the cradle 120.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A line clamp assembly comprising:
   a base comprising a first wing, a second wing, and a body, the body having an upper face and a lower face, the first wing and the second wing each extending from the body in a direction of the upper face to form an obtuse angle between the body and the first wing and between the body and the second wing, the first wing and the second wing each comprising a routing port, wherein the routing port of the first wing is an aperture extending through the first wing and the routing port of the second wing is an aperture extending through the second wing;
   a cradle comprising a generally C-shaped body that defines a channel and an opening, the generally C-shaped body having an inner surface and an outer surface, the outer surface having a top portion and a bottom portion opposite the top portion, the opening extending between the inner surface and the outer surface, the channel formed by the inner surface and configured to receive a line via the opening, the bottom portion of the outer surface of the cradle configured to sit directly on the upper face of the body of the base; and
   a clamp comprising a body configured to extend over the top portion of the cradle, the clamp having a first end and a second end, each of the first end and second end comprising an attachment, each of the first end and the second end configured to extend at least partially through and mate the attachment with a corresponding one of the routing port of the first wing and the second wing.

2. The line clamp assembly according to claim 1, wherein a force is applied to the cradle to compress the cradle such that the attachment of each of the first end and the second end is mated with the corresponding one of the routing port of the first wing and the second wing.

3. The line clamp assembly according to claim 2, wherein the force applied to the cradle is removed after the attachment of each of the first end and the second end is mated with the corresponding one of the routing port of the first wing and the second wing such that the cradle expands to apply pressure to the clamp.

4. The line clamp assembly according to claim 1, wherein:
   the attachment of the first end is mated with the routing port of the first wing,
   a force is applied to the cradle to compress the cradle after the mating of the attachment of the first end with the routing port of the first wing,
   the attachment of the second end is mated with the routing port of the second wing while the force is applied to the cradle, and
   the force applied to the cradle is removed after the mating of the attachment of the second end with the routing port of the second wing such that the cradle expands to apply pressure to the clamp.

5. The line clamp assembly according to claim 1, wherein the base is a unitary construction.

6. The line clamp assembly according to claim 1, wherein the base is at least one of:
   carbon steel,
   stainless steel, and
   aluminum.

7. The line clamp assembly according to claim 1, wherein the lower face of the body of the base is welded to a structure.

8. The line clamp assembly according to claim 1, wherein the bottom portion of the outer surface of the cradle comprises a bottom contour.

9. The line clamp assembly according to claim 8, wherein the upper face of the body of the base is shaped to mate with the bottom contour of the cradle.

10. The line clamp assembly according to claim 8, wherein the bottom contour of the generally C-shaped body is one of a same length or longer than the body of the base.

11. The line clamp assembly according to claim 1, wherein the cradle is a compressible plastic.

12. The line clamp assembly according to claim 1, wherein the cradle comprises a groove on the inner surface of the generally C-shaped body opposite the opening, the groove extending a length of the body.

13. The line clamp assembly according to claim 1, wherein the cradle comprises a recessed groove on the top portion of the outer surface configured to receive the clamp.

14. The line clamp assembly according to claim 1, wherein the attachment of one or more of the first end and the second end of the clamp is a bent end forming a hook.

15. The line clamp assembly according to claim 1, wherein the clamp is steel.

16. The line clamp assembly according to claim 1, wherein the first wing and the second wing comprise an inside surface and an outside surface, the inside surface on a first same side of the base as the upper face of the body, the outside surface on a second same side of the base as the lower face of the body, each of the first end and the second end of the clamp configured to extend from the outside surface toward the inside surface at least partially through the corresponding one of the routing port of the first wing and the second wing.

17. A method for retaining and routing a line along a structure, the method comprising:
   welding a base to the structure, the base comprising a first wing, a second wing, and a body, the body having an upper face and a lower face, the first wing and the second wing each extending from the body in a direction of the upper face to form an obtuse angle between the body and the first wing and between the body and the second wing, the first wing and the second wing each comprising a routing port, wherein the routing port of the first wing is an aperture extending through the first wing and the routing port of the second wing is an aperture extending through the second wing;
   manipulating the line into a cradle, the cradle comprising a generally C-shaped body that defines a channel and an opening, the generally C-shaped body having an inner surface and an outer surface, the outer surface having a top portion and a bottom portion opposite the top portion, the opening extending between the inner surface and the outer surface, the channel formed by the inner surface and receiving the line via the opening, the bottom portion of the outer surface of the cradle configured to sit directly on the upper face of the body of the base;
   placing the bottom portion of the outer surface of the cradle holding the line directly on the upper face of the body of the base;
   applying a force to the cradle to compress the cradle;

extending a clamp over the top portion of the compressed cradle, the clamp comprising a body having a first end and a second end, the first end comprising a first attachment and the second end comprising a second attachment;

attaching the first attachment and the second attachment to the base by extending each of the first end and the second end at least partially through and mating the first attachment and the second attachment with a corresponding one of the routing port of the first wing and the second wing; and removing the force to the cradle such that the cradle expands, the expanded cradle applying pressure to the clamp.

18. The method according to claim 17, wherein the first attachment is attached to the base before the force is applied to the cradle, and wherein the second attachment is attached to the base after the force is applied to the cradle.

19. The method according to claim 17, wherein the first attachment of the clamp is attached to a first routing port of a first wing of the base and the second attachment of the clamp is attached to a second routing port of a second wing of the base.

20. The method according to claim 17, wherein extending the clamp over the compressed cradle comprises receiving the clamp in a recessed groove of the compressed cradle.

* * * * *